(12) United States Patent
Yilmaz et al.

(10) Patent No.: US 10,178,689 B2
(45) Date of Patent: Jan. 8, 2019

(54) ADAPTIVE RESOURCE ALLOCATION FOR SIMULTANEOUS OPERATION OF CELLULAR AND DEVICE TO DEVICE COMMUNICATIONS

(71) Applicant: Nokia Technologies Oy, Espoo (FI)

(72) Inventors: Osman Yilmaz, Espoo (FI); Zexian Li, Espoo (FI); Mikko Uusitalo, Helsinki (FI); Martti Moisio, Klaukkala (FI); Esa Malkamäki, Espoo (FI); Haitao Li, Beijing (CN)

(73) Assignee: Nokia Technologies Oy, Espoo (FI)

( * ) Notice: Subject to any disclaimer, the term of this patent is extended or adjusted under 35 U.S.C. 154(b) by 8 days.

(21) Appl. No.: 14/899,756

(22) PCT Filed: Jul. 2, 2013

(86) PCT No.: PCT/CN2013/078661
§ 371 (c)(1),
(2) Date: Dec. 18, 2015

(87) PCT Pub. No.: WO2015/000130
PCT Pub. Date: Jan. 8, 2015

(65) Prior Publication Data
US 2016/0143052 A1 May 19, 2016

(51) Int. Cl.
*H04W 72/12* (2009.01)
*H04W 76/14* (2018.01)

(52) U.S. Cl.
CPC ... *H04W 72/1268* (2013.01); *H04W 72/1263* (2013.01); *H04W 76/14* (2018.02)

(58) Field of Classification Search
CPC ............ H04W 76/023; H04W 76/043; H04W 28/021
See application file for complete search history.

(56) References Cited

U.S. PATENT DOCUMENTS 9,198,210 B2    11/2015   Phan et al.
9,585,101 B2*   2/2017    Stern-Berkowitz ..........................
                                                     H04W 52/146
(Continued)

FOREIGN PATENT DOCUMENTS

CN    1538640    10/2004
CN    1787690    6/2006
(Continued)

OTHER PUBLICATIONS

Author Unknown, TS 36.321 V11.3.0, Mar. 2013, pp. 1-56.*
(Continued)

*Primary Examiner* — Christopher M Crutchfield
(74) *Attorney, Agent, or Firm* — Mintz Levin Cohn Ferris Glovsky and Popeo, P.C.

(57) ABSTRACT

In accordance with an example embodiment of the present invention, an apparatus comprising: at least one processor; and at least one memory including computer program code, wherein the at least one memory and the computer program code are configured to, with the at least one processor, cause the apparatus to perform at least the following: detect that a mode change is required; and in response to the detection that a mode change is required, select a mode for resource allocation, wherein the mode is selected based on a command received by the apparatus or the mode is selected from a plurality of modes which comprises a first mode and a second mode, and wherein in the first mode the cellular communication and device to device communication are separated in time, and in the second mode the cellular communication and device to device communication take place simultaneously.

22 Claims, 8 Drawing Sheets

(56) References Cited

U.S. PATENT DOCUMENTS

| | | | |
|---|---|---|---|
| 2009/0325625 A1 | 12/2009 | Hugl et al. | |
| 2010/0261469 A1* | 10/2010 | Ribeiro | H04W 99/00 455/423 |
| 2011/0237231 A1 | 9/2011 | Horneman et al. | |
| 2012/0093098 A1 | 4/2012 | Charbit et al. | |
| 2013/0089010 A1 | 4/2013 | Richardson et al. | |
| 2013/0108000 A1 | 5/2013 | Park et al. | |
| 2013/0157676 A1* | 6/2013 | Baek | H04W 72/0486 455/452.1 |
| 2013/0163555 A1 | 6/2013 | Turtinen et al. | |
| 2013/0201852 A1* | 8/2013 | Chou | H04W 24/02 370/252 |
| 2013/0288608 A1* | 10/2013 | Fwu | H04W 72/02 455/63.1 |
| 2014/0056243 A1* | 2/2014 | Pelletier | H04W 74/04 370/329 |
| 2015/0146687 A1* | 5/2015 | Kim | H04W 76/023 370/331 |
| 2015/0288508 A1* | 10/2015 | Wilhelmsson | H04W 76/023 370/280 |
| 2016/0081039 A1* | 3/2016 | Lindoff | H04W 52/383 455/450 |

FOREIGN PATENT DOCUMENTS

| | | |
|---|---|---|
| CN | 101137204 | 3/2008 |
| WO | 2011/147462 A1 | 12/2011 |
| WO | 2012/048464 A1 | 4/2012 |

OTHER PUBLICATIONS

Author Unknown, Initial considerations on D2D communication, 3GPP TSG RAN WG1 Meeting #73, May 24, 2013, pp. 1-3.*

"3rd Generation Partnership Project; Technical Specification Group Services and System Aspects; Feasibility study for Proximity Services (ProSe) (Release 12)", 3GPP TR 22.803, V12.1.0, Mar. 2013, pp. 1-45.

"Study on LTE Device to Device Proximity Services", 3GPP TSG-RAN meeting #58, RP-122009, Agenda: 13.2, Qualcomm Incorporated, Sep. 3-6, 2013, pp. 6.

Reider et al., "A Distributed Power Control and Mode Selection Algorithm for D2D Communications", EURASIP Journal on Wireless Communications and Networking, 2012, pp. 1-25.

Janis et al., "Interference-aware Resource Allocation for Device-to-device Radio Underlaying Cellular Networks", IEEE 69th Vehicular Technology Conference VTC Spring, 2009, 5 pages.

"3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321, V11.3.0, Jun. 2013, pp. 1-57.

Extended European Search Report received for corresponding European Patent Application No. 13888803.7, dated Jan. 19, 2017, 7 pages.

International Search Report and Written Opinion received for corresponding Patent Cooperation Treaty Application No. PCT/CN2013/078661, dated Apr. 3, 2014, 11 pages.

* cited by examiner

| C7 | C6 | C5 | C4 | C3 | C2 | C1 | $I_{D2D}$ |
|---|---|---|---|---|---|---|---|
| P | V | \multicolumn{6}{l|}{PH (Type 2, PCell)} |
| R | R | \multicolumn{6}{l|}{$P_{CMAX,c}$ 1} |
| P | V | \multicolumn{6}{l|}{PH (Type 1, PCell)} |
| R | R | \multicolumn{6}{l|}{$P_{CMAX,c}$ 2} |
| P | V | \multicolumn{6}{l|}{PH (Type 1, SCell 1)} |
| R | R | \multicolumn{6}{l|}{$P_{CMAX,c}$ 3} |

...

| P | V | PH (Type 1, SCell n) |
|---|---|---|
| R | R | $P_{CMAX,c}$ m |
| R | R | $P_{D2D}$ |

FIG. 6

ADAPTIVE RESOURCE ALLOCATION FOR SIMULTANEOUS OPERATION OF CELLULAR AND DEVICE TO DEVICE COMMUNICATIONS

RELATED APPLICATION

This application was originally filed as PCT Application No. PCT/CN2013/078661 filed Jul. 2, 2013.

TECHNICAL FIELD

The present application relates to wireless communications and, in particular, resource allocation for simultaneous operation of cellular and device to device communications.

BACKGROUND

There are various types of networks, including infrastructure networks (e.g., the internet, cellular networks, and/or the like), ad-hoc networks, or a combination of both. In the case of the infrastructure network, the user equipment communicates (e.g., transmits and/or receives) with another user equipment through an access point, such as base station or a wireless access point. In the case of the ad-hoc network, the user equipment communicates directly with another user equipment. Ad hoc networks are also called "proximity services" (ProSe) and/or "device-to-device" (D2D) networks, referring to the wireless direct link(s) between a plurality of user equipment. In the case of ad-hoc, D2D communications, some of the D2D communications are also controlled by one or more base stations, providing so-called "cellular controlled" D2D communications (which is also referred to as cellular assisted D2D communications). In cellular controlled D2D communications, two devices may be directly linked via a D2D connection, and the devices may be attached to one or more base stations, such as enhanced Node B (eNB) base stations, to exchange control information with the eNB base stations (or other nodes of the network).

SUMMARY

Various aspects of examples of the invention are set out in the claims.

According to a first aspect of the present invention, an apparatus comprising: at least one processor; and at least one memory including computer program code, wherein the at least one memory and the computer program code are configured to, with the at least one processor, cause the apparatus to perform at least the following: detect that a mode change is required; and in response to the detection that a mode change is required, select a mode for resource allocation, wherein the mode is selected based on a command received by the apparatus or the mode is selected from a plurality of modes which comprises a first mode and a second mode, and wherein in the first mode the cellular communication and device to device communication are separated in time, and in the second mode the cellular communication and device to device communication take place simultaneously.

According to a second aspect of the present invention, a method comprising: detecting, at an apparatus, that a mode change is required; and in response to the detection that a mode change is required, selecting a mode for resource allocation, wherein the mode is selected based on a command received by the apparatus or the mode is selected from a plurality of modes which comprises a first mode and a second mode, and wherein in the first mode the cellular communication and device to device communication are separated in time, and in the second mode the cellular communication and device to device communication take place simultaneously.

According to a third aspect of the present invention, a non-transitory computer-readable storage medium including computer code, which when executed by at least one processor provides operations comprising: detecting that a mode change is required; and in response to the detection that a mode change is required, selecting a mode for resource allocation, wherein the mode is selected based on a command received by the apparatus or the mode is selected from a plurality of modes which comprises a first mode and a second mode, and wherein in the first mode the cellular communication and device to device communication are separated in time, and in the second mode the cellular communication and device to device communication take place simultaneously.

According to a fourth aspect of the present invention, an apparatus comprising: means for detecting that a mode change is required; and in response to the detection that a mode change is required, means for selecting a mode for resource allocation, wherein the mode is selected based on a command received by the apparatus or the mode is selected from a plurality of modes which comprises a first mode and a second mode, and wherein in the first mode the cellular communication and device to device communication are separated in time, and in the second mode the cellular communication and device to device communication take place simultaneously.

BRIEF DESCRIPTION OF THE DRAWINGS

For a more complete understanding of example embodiments of the present invention, reference is now made to the following descriptions taken in connection with the accompanying drawings in which:

FIG. 6 depicts an example message format for extended power headroom reporting in accordance with some embodiments of the invention;

DETAILED DESCRIPTION OF THE DRAWINGS

In device-to-device communications, direct links between devices, such as user equipment (UE), can be established for communications between the devices. User equipment may be a multi-mode radio, which refers to a user equipment configured with a plurality of radio technologies, such as for example cellular radio, wireless local area networks, and/or the like. The D2D communication may be operated on the same frequency band as the cellular communication. The D2D communication may also be operated on different frequency band from the cellular frequency. For example, the D2D communication may be operated in an unlicensed band, a third party band, a dedicated D2D band, or the D2D paired devices belong to different operators and the D2D communication is carried on the visited operator's frequency band. In some scenarios, for example, in public safety use case, it is necessary to keep both D2D and cellular connections simultaneously active.

The subject matter disclosed herein provides a way for resource allocation for simultaneous operation of cellular and D2D communication for devices with dual radio frequency (RF) capabilities.

Figure 1:
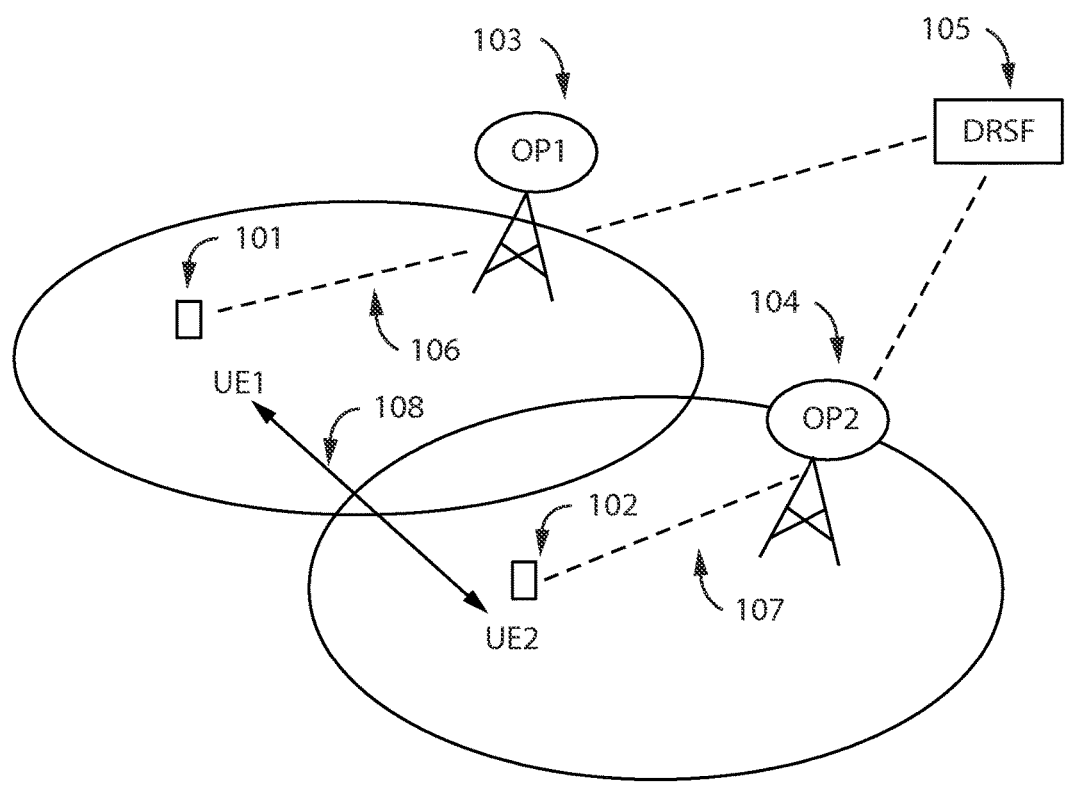
FIG. 1 depicts an example of a network in which some embodiments of the present invention may be practiced.

FIG. 1 illustrates an example network in which some example embodiments of the present invention may be practiced. In the example embodiments, two user equipments belonging to different operators may establish direct D2D communications among each other. As illustrated in FIG. 1, UE1 101 establishes direct D2D communication with UE2 102 via D2D radio link 108. Moreover, UE1 101 is in connection with a base station operated by a first operator 103 via cellular radio link 106, and UE2 102 is in connection with a base station operated by a second operator 104 via cellular radio link 107. Furthermore, a common network entity, for example, a D2D registration server function (DRSF) 105, may take part in D2D functions in multi-operator multi-radio environment. As illustrated in FIG. 1, the DRSF 105 takes part in D2D function between UE1 101 and UE2 102 through the base station operated by a first operator 103 and the base station operated by a second operator 104.

Figure 2:
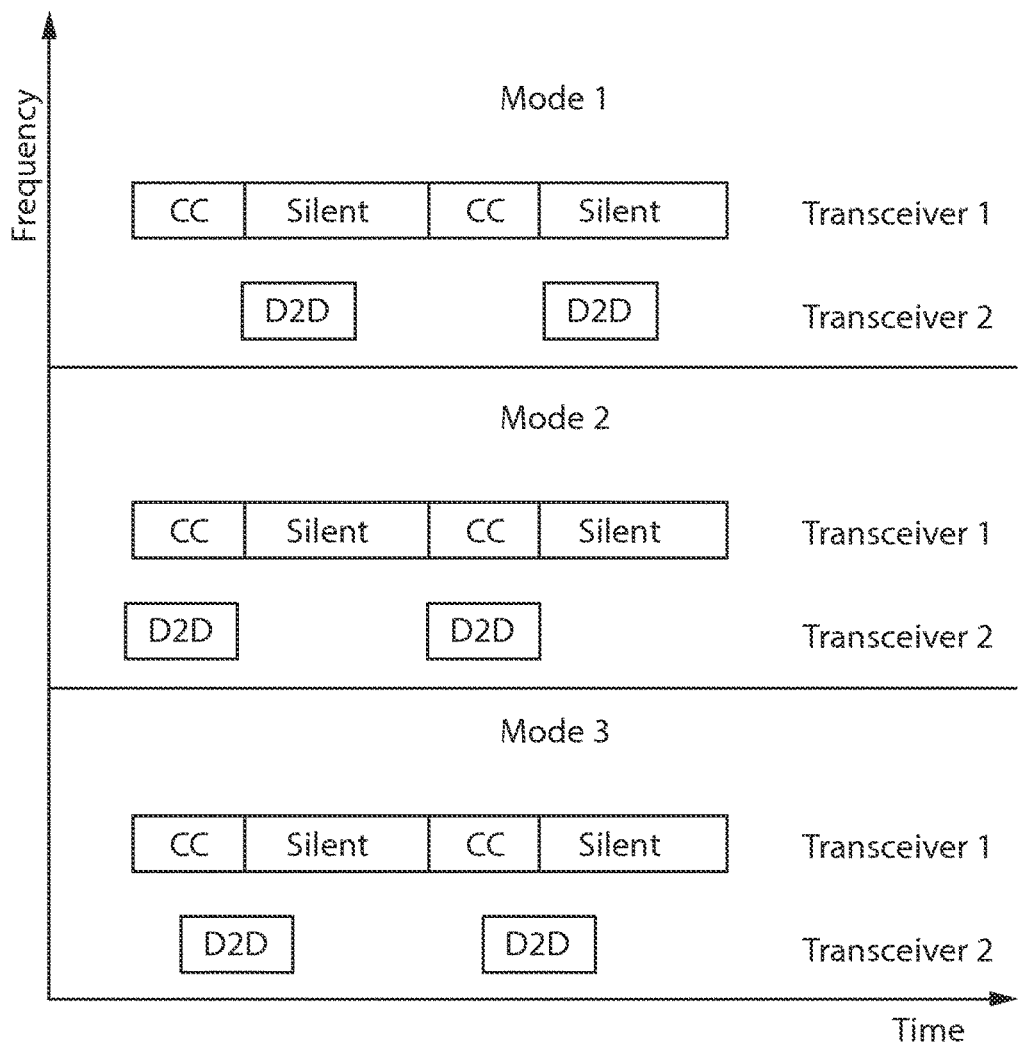
FIG. 2 depicts three example modes for simultaneous operation of D2D and cellular communications in accordance with some embodiments of the invention.

FIG. 2 depicts three example modes for simultaneous operation of cellular and D2D communications. As illustrated in FIG. 2, the first RF transceiver is used for cellular communication (CC) and the second transceiver is dedicated for D2D communication.

In mode 1, D2D communication and cellular communication are separated in time. In some example embodiments, D2D communication is carried only when cellular communication is in silent period. For example, the cellular communication may be in discontinuous reception (DRX) period, discontinuous transmission (DTX) period, restricted scheduling period, and/or the like.

In mode 2, the cellular communication and device to device communication take place simultaneously.

In mode 3, the cellular communication and device to device communication are partially separated in time and partially simultaneous.

With mode 1, the UE transmission or reception range may be maximized for both cellular and D2D communication because all the UE transmission power is dedicated for either cellular or D2D communication. With mode 2, energy-consumption may be reduced by switching off the common components of radio units, for example, base-band components.

Figure 3:
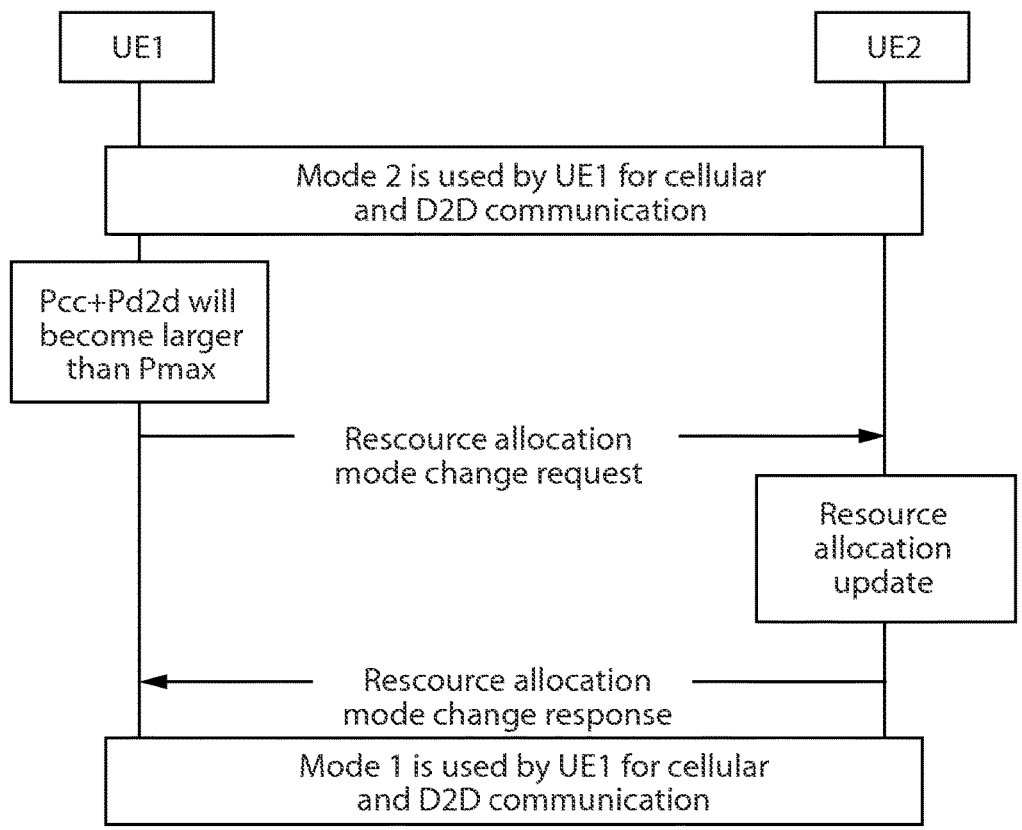
FIG. 3-5 depicts three example message sequence charts showing three possible signaling flows in accordance with some embodiments of the invention.

FIG. 3 depicts an example message sequence chart showing a possible signaling flow between a D2D paired devices.

In some example embodiments, mode 2 is currently used by UE1 for cellular and D2D communications. UE1 monitors whether a mode change is required, for example, a mode change to mode 1 or mode 3 may be required when the sum of transmission power required for cellular communication and D2D communication exceeds a threshold, $$P_{cc}+P_{d2d}>P_{thr}$$

wherein $P_{cc}$=uplink transmission power required for cellular communication, it may depend on the uplink data rate, for example, the uplink grant sent by a base station, $P_{d2d}$=D2D transmission power required, it may depend on the data rate used in D2D communication, $P_{max}$=maximum UE transmission power limitation specified for each UE class, and $P_{thr}$=total transmission power threshold which triggers the mode change. $P_{thr}$ may be less than or equal to the maximum UE transmission power $P_{max}$, $P_{thr} \leq P_{max}$.

In some example embodiments, in order to avoid frequent signaling, the need for mode change is determined or the mode change is requested when periodical transmission power demand exceeds the threshold, for example, when mean($P_{cc}+P_{d2d}$)>$P_{thr}$, max($P_{cc}+P_{d2d}$)>$P_{thr}$, and/or the like.

In response to detection that a mode change is required, UE1 may send a resource allocation mode change request message to a paired device UE2. UE1 may inform UE2 to have UE2's D2D reception period(s) aligned with UE1's D2D transmission period. In some example embodiments, UE2 may be a master UE. UE2 may perform resource allocation update. After performing resource allocation update, UE2 may send a resource allocation mode change response message to UE1 or send resource allocation information to UE1 without a dedicated response to the resource allocation mode change request. UE2 may further request network to adapt its DRX/DTX parameters and to apply scheduling restrictions to have a silent period aligned with its D2D reception period if it also needs to operate in mode 1 or mode 3. When UE1 receives the resource allocation mode change response message or the resource allocation information, UE1 starts to use mode 1 or mode 3 for cellular and D2D communications.

In some other example embodiments, mode 1 is currently used by UE1 for cellular and D2D communications. UE1 monitors whether a mode change is required, for example, a mode change to mode 2 or mode 3 may be required when the sum of transmission power required for cellular communication and D2D communication is less than or equal to a threshold, $$P_{cc}+P_{d2d} \leq P_{thr}.$$

In response to detection that a mode change is required, UE1 may perform the procedure as described above and starts to use mode 2 or mode 3 when it receives a resource allocation mode change response message or resource allocation information from UE2.

Figure 4:
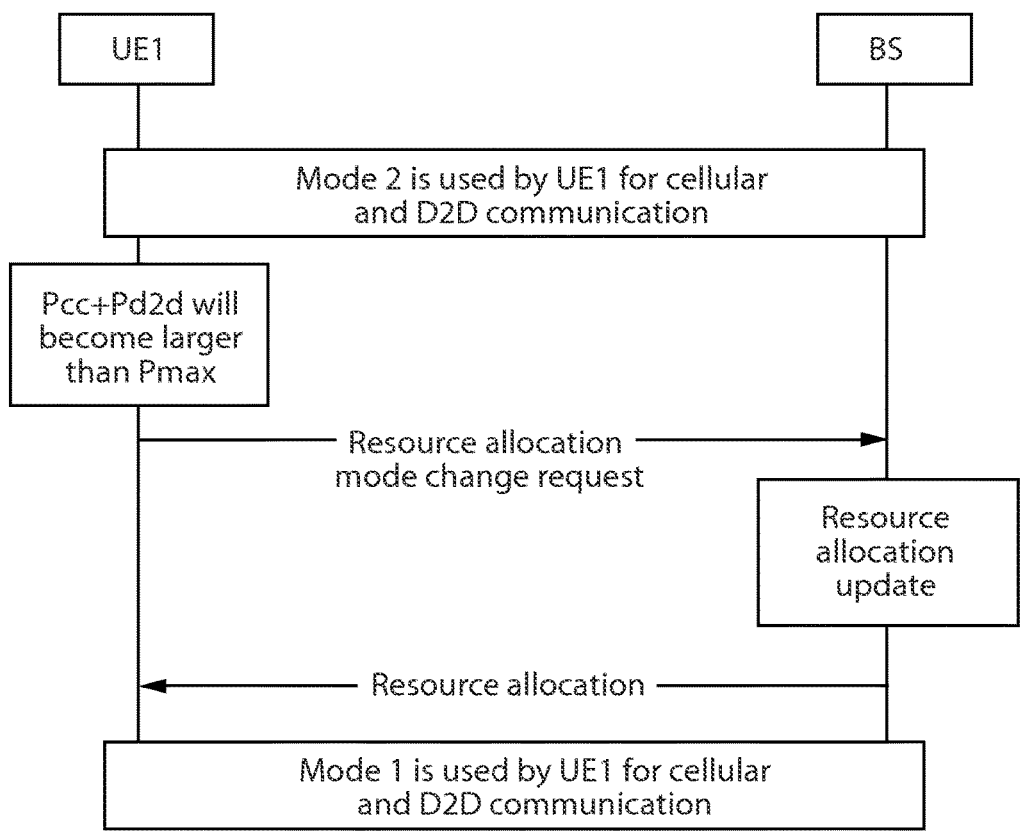

FIG. 4 depicts an example message sequence chart showing a possible signaling flow between a user equipment and a base station. In some example embodiments, mode 2 is currently used by UE1 for cellular and D2D communications. UE1 monitors whether a mode change is required, for example, a mode change to mode 1 or mode 3 may be required when the sum of transmission power required for cellular communication and D2D communication exceeds a threshold, $$P_{cc}+P_{d2d}>P_{thr}$$

In response to detection that a mode change is required, UE1 may send a resource allocation mode change request message to a base station. UE1 may request the base station to adapt some parameters, for example, DRX/DTX parameters, and to apply scheduling restrictions to have a silent period aligned with UE1's D2D transmission period. In some example embodiments, the resource allocation mode change request may comprise existing D2D resource allocation information if the D2D resource allocation information is not available in the network. In some example embodiments, the resource allocation mode change request may comprise D2D service quality of service (QoS) parameters, for example, QoS class identifier (QCI). The base station may perform resource allocation update and send a resource allocation message to UE1. The resource allocation message may comprise slot numbers that UE1 is scheduled or not scheduled in D2D and/or cellular communication. For example, in LTE/LTE-A, the resource allocation message may comprise the subframe numbers that UE1 is scheduled or not scheduled in D2D and/or cellular communication. The resource allocation message may comprise DRX parameters, for example, DRX offset and DRX cycle which indicate when DRX cycle starts and may end. When UE1 receives the resource allocation message, UE1 starts to use mode 1 or mode 3 for cellular and D2D communications.

Figure 5:
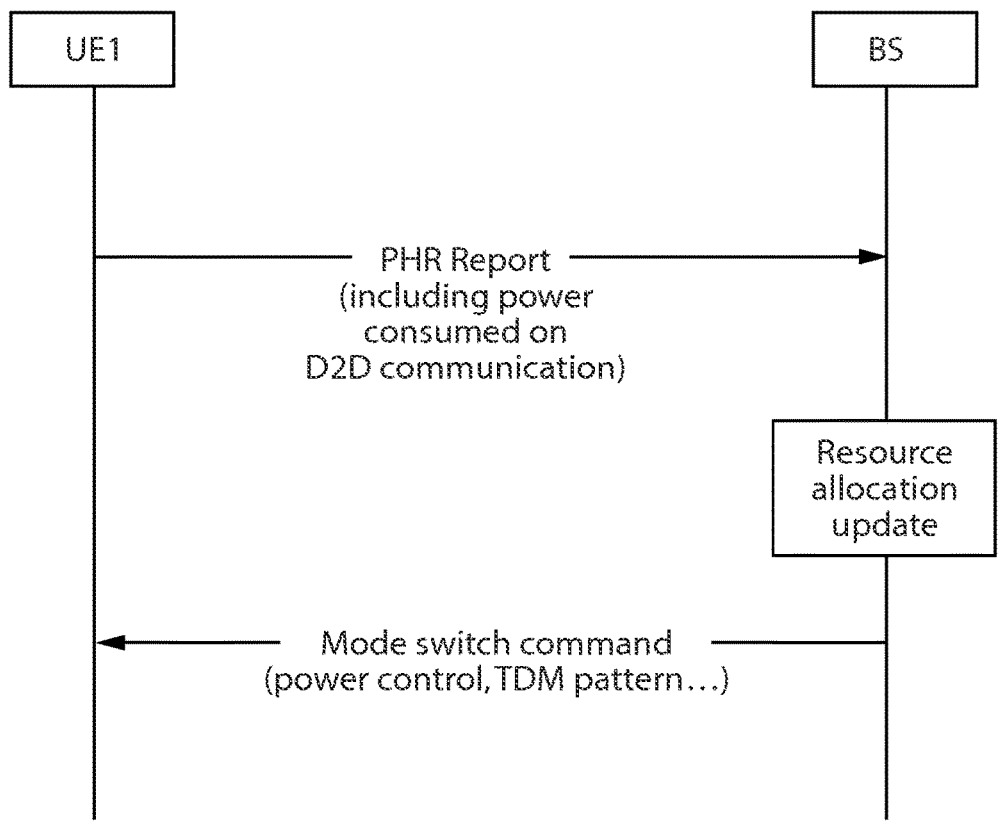

FIG. 5 depicts another example message sequence chart showing a possible signaling flow between a user equipment and a base station.

In some example embodiments, some existing signaling format may be used for a UE to report the power required for D2D transmission to a base station. For example, in LTE/LTE-A, UE uses power headroom report (PHR) to assist the base station to perform power control and scheduling, for example, base station may utilize the PHR report to determine the UE's transmission data rate for cellular communication, transmission start time, transmission interval, and/or the like. Reference can be made to 3GPP TS 36.321 V11.3.0 (2013-03) 3rd Generation Partnership Project; Technical Specification Group Radio Access Network; Medium Access Control (MAC) protocol specification (Release 11). As illustrated in FIG. 5, UE1 reports to a base station the power required for D2D communication in a PHR report. Based at least in part on the power required for D2D communication received in the PHR report, base station decides whether UE1 needs to switch mode. If base station decided to switch mode for UE1, it may issue a command to UE1 with decided power. For example, it may issue a mode switch command or another command such as scheduling decision/restriction or DRX/DTX configuration to UE1. For example, UE1 is operating in mode 2 and sends the power required for D2D communication in PHR report to base station. If base station determines that the power for cellular communication plus the power for D2D communication exceeds a certain threshold, it may decide to switch to mode 1 and issues a command to UE1. Moreover, the command may include the mode to be switched to if there are more than two modes available for the selection of switching. Referring to the previous example, the base station may select between mode 1 and mode 3 when deciding which mode to switch to. Furthermore, the mode switch command may include scheduling results, for example, time division multiplex (TDM) pattern such as when the cellular and D2D communications are scheduled.

It is noted that the base station illustrated in FIG. 5 is described for purposes of example, UE1 and UE2 may be controlled by two different base stations according to the present invention. It is also noted that the signaling flows illustrated in FIG. 3-5 are described for purposes of example, the D2D communications may be operated among more than two users according to the present invention.

FIG. 6 depicts an example message format for extended power headroom reporting. As illustrated in FIG. 6, in the first Octet, the last reserved bit, for example, bit $I_{D2D}$ may be used to indicate whether D2D power is included. If this bit is set, for example, the bit is set to 1, then at the end of the PHR, power consumed on D2D communication, $P_{D2D}$, is reported.

Figure 7:
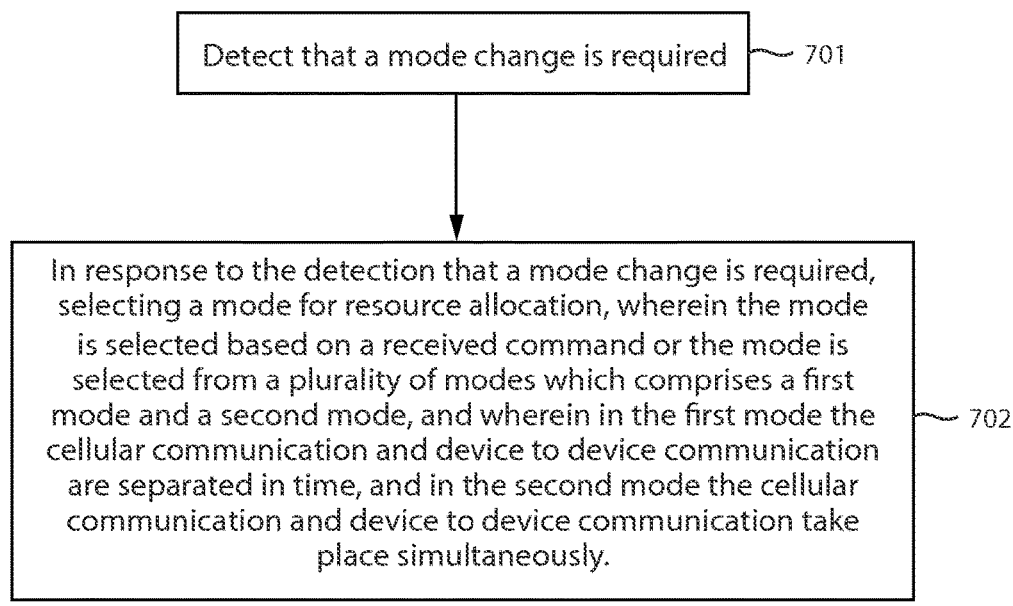
FIG. 7 depicts an example process for resource allocation for D2D and cellular communications in accordance with some embodiments of the invention.

FIG. 7 depicts an example process for resource allocation for D2D and cellular communications. The example process may be performed by or in an apparatus in accordance with some example embodiments.

At 701, the apparatus detects that a mode change is required. In some example embodiments, the apparatus detects that a mode change is required when some criteria is satisfied. For example, as described for FIG. 3 and FIG. 4, the apparatus operating in mode 2 may detect that a change to mode 1 is required when the accumulated power for cellular and D2D communications exceeds a certain threshold. In some other example embodiments, the apparatus detects that a mode change is required when it receives a mode switch command from a base station, for example, as described for FIG. 5.

At 702, the apparatus selects a mode for resource allocation in response to the detection that a mode change is required. In some example embodiments, the mode is selected by the apparatus from a plurality of modes. For example, as described for FIG. 3 and FIG. 4, when the apparatus operating in mode 2 detects a change to mode 1 is required, it may select mode 1 for cellular and D2D communications. In some other embodiments, the mode is selected based on a command received by the apparatus. For example, the mode is selected based on a mode switch command or another command such as scheduling decision/restriction or DRX/DTX configuration received by the apparatus. Referring to the previous example in FIG. 5, when the apparatus operating in mode 2 receives a mode switch command from the base station, it selects mode 1 for cellular and D2D communications.

It is noted that the functionalities of base station for D2D resource control as illustrated in FIG. 3-7 are described for purposes of example, other entities, for example, DRSF, may also be used as the coordinating entity for D2D resource control according to the present invention.

Figure 8:
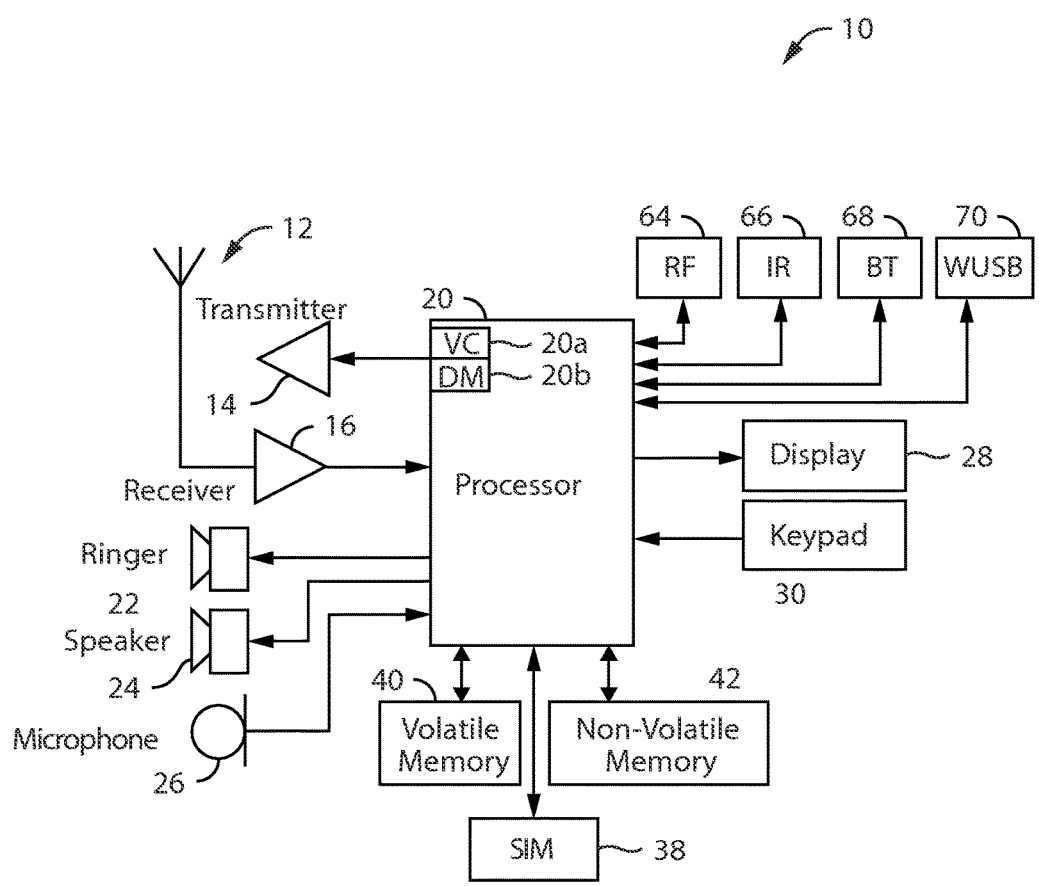
FIG. 8 illustrates a block diagram of a user equipment in accordance with some embodiments of the invention.

FIG. 8 illustrates a block diagram of an apparatus 10, which can be configured as user equipment in accordance with some example embodiments.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. Accordingly, although illustrated in FIG. 8 as a single processor, in some embodiments the processor 20 comprises a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the apparatus 10 may be capable of operating in accordance with 2.5G wireless communication protocols General Packet Radio Service. GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4G, wireless communication protocols such as LTE Advanced and/or the like as well as similar wireless communication protocols that may be developed in the future.

Some Narrow-band Advanced Mobile Phone System, NAMPS, as well as Total Access Communication System, TACS, mobile terminal apparatuses may also benefit from embodiments of this invention, as should dual or higher mode phone apparatuses, for example, digital/analog or TDMA/CDMA/analog phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor may additionally comprise an internal voice coder, VC, 20a, an internal data modem, DM, 20b, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus 10 may comprise a battery for powering various circuits related to the apparatus, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 8, apparatus 10 may also include one or more means for sharing and/or obtaining data. For example, the apparatus may comprise a short-range radio frequency, RF, transceiver and/or interrogator 64 so data may be shared with and/or obtained from electronic devices in accordance with RF techniques. The apparatus may comprise other short-range transceivers, such as, for example, an infrared, IR, transceiver 66, a Bluetooth™, BT, transceiver 68 operating using Bluetooth™ brand wireless technology developed by the Bluetooth™ Special Interest Group, a wireless universal serial bus, USB, transceiver 70 and/or the like. The Bluetooth™ transceiver 68 may be capable of operating according to low power or ultra-low power Bluetooth™ technology, for example, Wibree™, radio standards. In this regard, the apparatus 10 and, in particular, the short-range transceiver may be capable of transmitting data to and/or receiving data from electronic devices within a proximity of the apparatus, such as within 10 meters, for example. Although not shown, the apparatus may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module, SIM, 38, a removable user identity module, R-UIM, and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment. The memories may comprise an identifier, such as for example, an international mobile equipment identification (IMEI) code, capable of uniquely identifying apparatus 10.

While FIG. 8 is described above primarily in the context of a user equipment, certain of the components discussed, such as memories, processors, transceivers and antennas, may be employed to implement in a network-side device.

Without in any way limiting the scope, interpretation, or application of the claims appearing below, a technical effect of one or more of the example embodiments disclosed herein may include enabling adaptive resource allocation for simultaneous operation of cellular communication and device to device communications.

Embodiments of the present invention may be implemented in software, hardware, application logic or a combination of software, hardware and application logic. The software, application logic and/or hardware may reside on memory 40 and/or 42, the control apparatus 20 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 8. A computer-readable medium may comprise a computer-readable non-transitory storage medium that may be any media or means that can contain or store the instructions for use by or in connection with an instruction execution system, apparatus, or device, such as a computer. The scope of the present invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims. Other embodiments may be within the scope of the following claims. The term "based on" includes "based at least in part on".

What is claimed is:

1. A method, comprising:
    detecting, at an apparatus having a first transceiver and a second transceiver, that a mode change is required;
    in response to the detection that a mode change is required:
        selecting a mode for resource allocation, wherein the mode is selected based at least on a command received by the apparatus, wherein the mode is selected from a plurality of modes comprising a first mode and a second mode, wherein the apparatus in the first mode uses the first transceiver to engage in cellular communication and the second transceiver to engage in device to device communication at separate times, and wherein the apparatus in the second mode simultaneously uses the first transceiver to engage in cellular communication and the second transceiver to engage in device to device communication; and
    sending, to a base station, a request to adjust a discontinuous reception period and/or a discontinuous transmission period associated with the cellular communication, the discontinuous reception period and/or the discontinuous transmission period being adjusted in accordance with the selected mode for resource allocation.

2. The method of claim 1, wherein the plurality of modes further comprises a third mode, and wherein the apparatus in the third mode uses the first transceiver to engage in cellular communication and the second transceiver to engage in device to device communication in part at separate times and in part simultaneously.

3. The method of claim 1, wherein the mode change is required in response to detecting that a transmission power for simultaneously using the first transceiver to engage in cellular communication and the second transceiver to engage in device to device communication exceeds a threshold, and wherein the mode change comprises selecting at least one of the first mode and the third mode for resource allocation.

4. The method of claim 1, wherein the mode change is required in response to detecting that a transmission power for simultaneously using the first transceiver to engage in cellular communication and the second transceiver to engage in device to device communication does not exceed a threshold, and wherein the mode change comprises selecting at least one of the second mode and the third mode for resource allocation.

5. The method of claim 1, further comprising:
    in response to the detection that the mode change is required, sending a resource allocation mode change request to at least one of a paired device and the base station.

6. The method of claim 1, further comprising:
    receiving a resource allocation message from at least one of a paired device and the base station.

7. The method of claim 6, wherein the resource allocation message comprises at least one of the following: subframe numbers that the apparatus are scheduled or not scheduled, discontinuous reception offset, discontinuous reception cycle, and power allocation.

8. The method of claim 1, wherein the command comprises at least one of a mode switch command, a scheduling decision, a scheduling restriction, discontinuous reception configuration, and discontinuous transmission configuration.

9. The method of claim 1, wherein detecting that a mode change is required comprises receiving a mode switch command from the base station or a paired device.

10. The method of claim 1, further comprising:
    reporting power required for device to device communication in a power headroom report message to the base station.

11. The method of claim 1, wherein in response to the selection of the first mode of resource allocation, the base station is requested to adjust the discontinuous reception period and/or the discontinuous transmission period such periods of device to device communication align with silent periods of cellular communication.

12. The method of claim 1, wherein in response to the selection of the second mode of resource allocation, the base station is requested to adjust the discontinuous reception period and/or the discontinuous transmission period such that periods of cellular communication coincide with periods of device to device communication.

13. An apparatus, comprising:
at least one processor; and
at least one memory including computer program code, wherein the at least one memory and the computer program code are configured to, with the at least one processor, cause the apparatus to at least:
detect that a mode change is required;
in response to the detection that a mode change is required:
select a mode for resource allocation, wherein the mode is selected based at least on a command received by the apparatus, wherein the mode is selected from a plurality of modes comprising a first mode and a second mode, wherein the apparatus in the first mode uses a first transceiver to engage in cellular communication and a second transceiver to engage in device to device communication at separate times, and wherein the apparatus in the second mode simultaneously uses the first transceiver to engage in cellular communication and the second transceiver to engage in device to device communication; and
send, to a base station, a request to adjust a discontinuous reception period and/or a discontinuous transmission period associated with the cellular communication, the discontinuous reception period and/or the discontinuous transmission period being adjusted in accordance with the selected mode for resource allocation.

14. The apparatus of claim 13, wherein the plurality of modes further comprises a third mode, and wherein the apparatus in the third mode uses the first transceiver to engage in cellular communication and the second transceiver to engage in device to device communication in part at separate times and in part simultaneously.

15. The apparatus of claim 13, wherein the mode change is required in response to detecting that a transmission power for simultaneously using the first transceiver to engage in cellular communication and the second transceiver to engage in device to device communication exceeds a threshold, and wherein the mode change comprises selecting at least one of the first mode and the third mode for resource allocation.

16. The apparatus of claim 13, wherein the mode change is required in response to a detection of a transmission power for simultaneously using the first transceiver to engage in cellular communication and the second transceiver to engage in device to device communication does not exceed a threshold, and wherein the mode change comprises a selection of at least one of the second mode and the third mode for resource allocation.

17. The apparatus of claim 13, wherein the apparatus is further caused to at least:
in response to the detection that a mode change is required, send a resource allocation mode change request to at least one of a paired device and the base station.

18. The apparatus of claim 13, wherein the apparatus is further caused to at least:
receive a resource allocation message from at least one of a paired device and the base station.

19. The apparatus of claim 18, wherein the resource allocation message comprises at least one of the following: subframe numbers that the apparatus are scheduled or not scheduled, discontinuous reception offset, discontinuous reception cycle, and power allocation.

20. The apparatus of claim 13, wherein the command comprises at least one of a mode switch command, a scheduling decision, a scheduling restriction, discontinuous reception configuration, and discontinuous transmission configuration.

21. The apparatus of claim 13, wherein the detection that the mode change is required comprises a receipt of a mode switch command from the base station or a paired device.

22. The apparatus of claim 13, wherein the apparatus is further caused to at least:
report power required for device to device communication in a power headroom report message to the base station.

* * * * *